Figure 1:
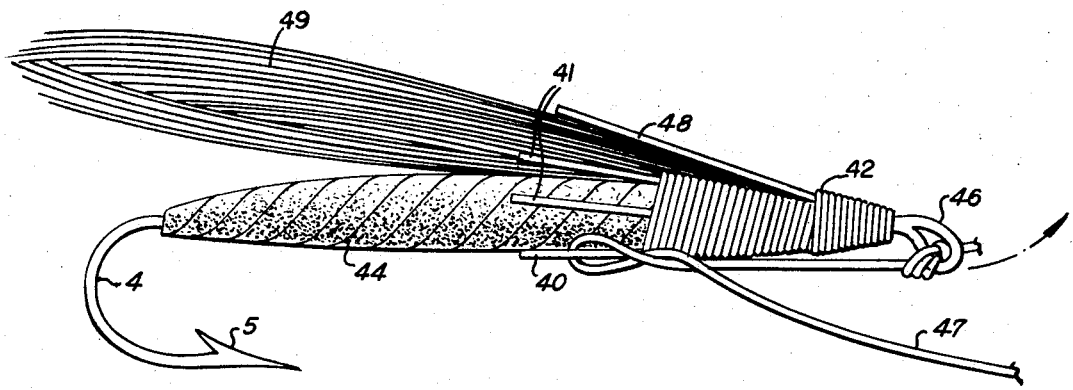

United States Patent [19]

Putnam

[11] 3,724,119
[45] Apr. 3, 1973

[54] FISHING FLY WITH LEADER ATTACHING PRONGS

[75] Inventor: Allen Lewis Putnam, Fullerton, Calif.

[73] Assignees: Allen Putnam; Leland C. Launer; Mark L. Kerridge, all of Fullerton, Calif. ; part interest to each

[22] Filed: Mar. 16, 1970

[21] Appl. No.: 24,444

Related U.S. Application Data

[62] Division of Ser. No. 704,457, Feb. 12, 1968, Pat. No. 3,500,574.

[52] U.S. Cl. ................................................43/42.25
[51] Int. Cl. ............................................A01k 85/08
[58] Field of Search.....................................43/42.25

[56] References Cited

UNITED STATES PATENTS 2,033,530   3/1936   Meinecke..........................43/42.25
975,833   11/1910   Cox................................43/42.25 X

*Primary Examiner*—Russell R. Kinsey
*Assistant Examiner*—Daniel J. Leach
*Attorney*—Laurence R. Brown

[57] ABSTRACT

A fishing fly comprising a hook having a shank, an eye and a barbed point, a fly body and head formed on the shank between the eye and the barbed point and an attaching means for a leader mounted between the head and the body. The attaching means is lashed to the fly body and to the hook shank to form top and bottom prongs and right and left side prongs extending from their positions behind said head to points substantially half-way down the length of the fly's body.

1 Claim, 2 Drawing Figures

PATENTED APR 3 1973

3,724,119

INVENTOR
ALLEN L. PUTNAM

BY Carl T. Mack.
ATTORNEY

FISHING FLY WITH LEADER ATTACHING PRONGS

This is a division of application, Ser. No. 704,657, filed Feb. 12, 1968, now U.S. Pat. No. 3,500,574, issued Mar. 17, 1970.

This invention relates to fishing flies, lures and nymphs and the like and has basically for its object the production of a simple method of making lures that will permit most anglers to operate an exact imitation of the insect in question.

An objective termed by the inventor the "Actions-Fly" is a means of bringing about erratic fly movement in the water, when properly fished, accomplished by looping the line over one of the monofilament stubs provided near the head of the fly, which, when manipulated properly, drags the fly from a point other than the edge of the hook.

The inventor has, in producing his novel lure, employed standard materials and methods or he may employ a plastic device which incorporates the semi-flexible fibers or semi-flexible stubs hereinafter described, to be part of the fly which is to be wrapped and tied in traditional manner. The tying of flies has been a fascinating avocation for fishermen but in commercial ventures, most of the fly tying is accomplished today by ladies who become very adept at tying the many fly patterns employed.

ACTIONS-FLY

This name, for the purpose of better disclosing the invention, is applied to an attachment on fishing hooks such as used with artificial flies, to impart to the finished fly action and direction, differing from the action and direction associated with the fly when fished in the normal manner from the eye thereof. The "Actions-Fly" is to simulate a wounded minnow turning on its side or swimming in an impaired manner, thus adding an upward, downward or across-current movement to the streamer, wet or dry fly patterns.

The customary leader which is fastened to the fishing line and to the eye of the fly hook becomes frayed and cut when used, even in normal casting and fishing when too much pressure is exerted on the fly and leader, to say nothing of the cutting action which is associated with the leader when the normal casting and fishing pressures are exceeded. Hence, the "Actions-Fly" construction herein employed is also designed to narrow down and protect damage to the fishing leader.

The fundamental purposes in employing a manufactured clip is the same as that in employing standard tying materials, since in both instances clips or their equivalents are employed. When the leader is secured to the fly, each position of the clip will provide a different leverage and, therefore, action on the fly.

The so-called manufactured clip is shown in FIGS. 4 and 6 of the drawings of U.S. Pat. No. 3,500,574 and reference is to be had to these drawings which form a part of this specification. In the present application FIGS. 1 and 2 represent a fly constructed in accordance with the invention with fiber clips to receive the line and release it after a strike respectively.

Figure 2:
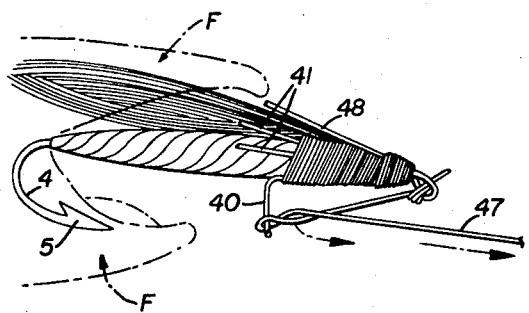

Referring to FIG. 1, the leader 47 is first tied to the eye 46 of the hook and then by employing a half-hitch can be placed over anyone of the fiber clips or prongs 40, 41 or 48. The leader 47, half-hitched about prong 40, responds to the pressure placed upon it and gradually the prong will yield. In so doing, it becomes that the position of the clip will provide a different leverage and therefore action on the fly. When the pressure on the leader 47 (the fish having been caught) becomes excessive, it will overcome the tension of the prong 40 and the leader will be released, to be on its own, so to speak, since it is secured to the eye 46 of the hook.

The fishing fly is entirely novel and is adapted to be fished in a manner entirely different from the conventional manner of fishing a fly wherein the hook's eye is attached to the leader and the line. In the present development, the leader is secured to the eye of the hook; then a half-hitch of the leader is made and this half-hitch is looped over the stubs or prongs on the fly body.

A conventional hook 4 with the eye 46 has a barb 5. Held about its shank in a conventional manner is a fly body 44. Holding the body material 44 near the eye 46 is a tying thread 42 wrapped about the prongs 40 and 41 until the prongs are drawn down to the fly body enough to make a clip. A single monofilament fiber 48 is tied on top of the wing 49 by a portion of the tying thread 42, the purpose being to form a fifth prong or clip behind the head of the fly and on top of the fly.

There is shown in FIG. 2 a rough outline of the head of a fish F, its mouth being open and about to gorge itself on the lure. The leader 47, half-hitched about prong 40, responds to the pressure placed upon it and gradually the prong will yield. In so doing, it becomes apparent that the position of the clip will provide a different leverage and therefore action on the fly. The showing in FIG. 2 teaches also that when the pressure on the leader 47 (the fish F having been caught) becomes excessive, it will overcome the tension of the prong 40 and the leader will be released, to be on its own, so to speak, since it is secured to the eye 46 of the hook.

I claim:

1. A fishing fly comprising a hook having a shank, an eye for receiving a leader tied thereto and a barbed point, a fly body formed on the shank between the eye and the barbed point, a tying thread, a plurality of flexible prongs lashed to said body and said hook shank by said tying thread extending from positions behind the eye to points substantially half-way down the length of the fly body with ends exposed at a position remote from the eye and adapted to receive the leader tied to said eye thereabout until pressure of the leader overcomes tension of the prong to release the leader, a wing portion extending substantially the length of the fly body on top of said body, a monofilament fiber 48 on top of said wing and extending substantially half-way down the length of the fly body to form a further prong, and a portion of said tying thread wound about said body on top of said wing and fiber behind the eye to expose said fiber end over a longer distance along said body than said prongs.

* * * * *